US005473377A

United States Patent [19]
Kim

[11] Patent Number: 5,473,377
[45] Date of Patent: Dec. 5, 1995

[54] METHOD FOR QUANTIZING INTRA-BLOCK DC TRANSFORM COEFFICIENTS USING THE HUMAN VISUAL CHARACTERISTICS

[75] Inventor: Sang-Ho Kim, Seoul, Rep. of Korea

[73] Assignee: Daewoo Electronics Co., Ltd., Seoul, Rep. of Korea

[21] Appl. No.: 253,516

[22] Filed: Jun. 3, 1994

[30] Foreign Application Priority Data

Jun. 4, 1993 [KR] Rep. of Korea ............... 93-10125

[51] Int. Cl.[6] .................................. H04N 7/30
[52] U.S. Cl. .................. 348/405; 348/419; 348/390; 358/432; 358/433
[58] Field of Search .................. 358/432, 433, 358/426, 465, 466, 447; 348/405, 419, 400, 403, 401, 420, 399; 341/200

[56] References Cited

U.S. PATENT DOCUMENTS

| 4,698,689 | 10/1987 | Tzou | 348/405 |
| 5,126,857 | 6/1992 | Watanabe et al. | 358/432 |
| 5,294,974 | 3/1994 | Naimpally et al. | 348/405 |
| 5,323,187 | 6/1994 | Park | 348/405 |
| 5,335,016 | 8/1994 | Nakagawa | 348/405 |

*Primary Examiner*—Edward L. Coles, Sr.
*Assistant Examiner*—Fan Lee
*Attorney, Agent, or Firm*—Anderson Kill Olick & Oshinsky

[57] ABSTRACT

The quantization of intra-block DC transform coefficients is improved through the use of human visual characteristics. The method comprises the steps of converting each of the plurality of blocks included in the input digital video signal into a set of inter-block or intra-block DC and AC transform coefficients; selecting an intra-block DC transform coefficient from said set of inter-block or intra-block DC and AC transform coefficients; determining an intra-block DC quantizer step size based on a set of the selected intra-block DC transform coefficients; and generating a quantized intra-block DC transform coefficient from each of the transform coefficients included in the set of the selected intra-block DC transform coefficient through the use of the intra-block DC quantizer step size.

3 Claims, 3 Drawing Sheets

METHOD FOR QUANTIZING INTRA-BLOCK DC TRANSFORM COEFFICIENTS USING THE HUMAN VISUAL CHARACTERISTICS

FIELD OF THE INVENTION

The present invention relates to a method for encoding a video signal; and, more particularly, so a method for adjusting the quantizer step size of intra-block DC transform coefficients in accordance with human visual characteristics, to thereby improve the transmission efficiency while maintaining the quality of the transmitted image.

DESCRIPTION OF THE PRIOR ART

In various electronic/electrical applications such as high definition television and video telephone systems, a video signal may need be transmitted in a digitized form. When the video signal comprising a sequence of video "frames" is expressed in a digitized form, there is bound to occur a substantial amount of digital data, for each line of a video frame is defined by a sequence of digital data elements referred to as "pixels". Since, however, the available frequency bandwidth of a conventional transmission channel is limited, in order to transmit the substantial amount of digital data through the channel, the use of a video signal encoding apparatus may become necessary to compress or reduce the volume of the data to be transmitted.

The video signal can be normally compressed without seriously affecting its integrity because there usually exist certain correlationships or redundancies among some of the pixels in a single frame and also among those of neighboring frames. Among various video compression techniques, the so-called hybrid coding technique, which combines temporal and spatial compression techniques together with a statistical coding technique, is known to be most effective.

Most hybrid coding techniques employ an adaptive inter/intra mode coding, orthogonal transform, quantization of transform coefficients, and VLC(variable length coding). The adaptive inter/intra-mode coding is a process of selecting a video signal for a subsequent orthogonal transform from either PCM(pulse code modulation) data of a current frame or DPCM (differential pulse code modulation) data adaptively, e.g., based on a variance thereof. The inter-mode coding, also known as the predictive method, which is based on the concept of reducing the redundancies between neighboring frames, is a process of determining the movement of an object between a current frame and its one or two neighboring frames, and predicting the current frame according to the motion flow of the object to produce a difference signal representing the difference between the current frame and its prediction. This coding method is described, for example, in Staffan Ericsson, "Fixed and Adaptive Predictors for Hybrid Predictive/Transform Coding", *IEEE Transactions on Communications*, COM-33, No. 12(December 1985); and in Ninomiya and Ohtsuka, "A Motion-Compensated Interframe Coding Scheme for Television Pictures", *IEEE Transactions on Communications*, COM-30, No. 1 (January 1982), both of which are incorporated herein by reference.

The orthogonal transform, which exploits the spatial correlationships between image data such as PCM data of the current frame or motion compensated DPCM data, and reduces or removes spatial redundancies therebetween, converts a block of digital image data into a set of transform coefficients. This technique is described in Chen and Pratt, "Scene Adaptive Coder", *IEEE Transactions on Communications*, COM-32, No. 3(March 1984). By processing such transformation coefficient data with quantization and VLC, the amount of data to be transmitted can be effectively compressed.

Specifically, in the orthogonal transform such as DCT-(discrete cosine transform) or the like, the image data is divided into equal-sized blocks, for example, blocks of 8×8 pixels, and each of the blocks is transformed from the spatial domain to the frequency domain. As a result, one DC coefficient and a plurality of(e.g., 63) AC coefficients are obtained. The DC coefficient of the block reflects the average intensity of the pixels in the block. In general, the intra-mode input video signal has values ranging from 0 to 255, giving a dynamic range for the intra-block DC transform coefficient from 0 to 2040 which can be represented in 11 bits; and a maximum dynamic range for any intra-block AC transform coefficient from about −1000 to 1000. In case of an inter-mode input video signal which has values ranging from −255 to 255, a maximum dynamic range for any AC or DC transform coefficient is about −2000 to 2000.

The orthogonal transform coefficients resulting from the orthogonal transform are then quantized. In carrying out the quantization, a smaller quantizer step size(or quantization step size) entails a larger amount of data requiring a larger number of code bits for the representation thereof, whereas a larger quantizer step size results in a lower volume of data needing a fewer number of code bits for their representation. And, a larger number of code bits can represent an image more precisely than a fewer number of code bits. Accordingly, there exists a tradeoff between the amount of data or burden thrust upon a transmission channel and the quality of the image transmitted.

A variety of quantizer step size control schemes has been proposed in the art. In these schemes, the quantizer step size control usually means the control of the step size employed in quantizing inter-block AC and DC, and intra-block AC coefficients. Such quantizer step size control is determined based on the amount of data currently stored in a buffer memory and the complexity of the input video signal. It has been further proposed that, in view of a lower human visual sensitivity at higher frequencies, a larger quantizer step size may be used for the orthogonal transform coefficients at higher frequencies without compromising the perceived quality of an image. Similarly, a smallest quantizer step size has been proposed in quantizing the DC coefficient which corresponds to the lowest frequency among the orthogonal transform coefficients.

However, in the prior art schemes described above, the quantizer step size is adaptively varied only for the inter-block AC and DC coefficients and intra-block AC coefficients. In case of the intra-block DC coefficient, it is quantized with a relatively small fixed step size, e.g., 8, as disclosed in the MPEG-1 standard or with a variable step size, e.g., 1, 2, 4 or 8, which can be adaptively adjusted for a picture (the term "picture" used herein denotes "field" or "frame" of a video signal) but is fixed within the picture as recommended in the MPEG-2 standard. That is, the intra-block DC coefficient is quantized uniformly at least within a picture without a due regard paid to the details of the image, e.g., intensity thereof, in the picture, which may lower the image quality due to, e.g., a "blocking effect". The blocking effect is a phenomenon wherein the border line of a block becomes visible at the receiving end. Such blocking effect occurs since a frame is encoded in units of blocks; and may become more serious as the quantizer step size becomes larger, i.e., as the blocks undergo more coarse quantization.

Accordingly, if a certain block is much brighter or darker than its adjacent blocks, and, a fixed large quantizer step size is used for the intra-block DC coefficient, the intensity difference between said certain block and its adjacent blocks may become even more pronounced, resulting in a more severe blocking effect and reducing the quality of the image.

As described above, representation of the intra-block DC coefficient value will require 11 bits; accordingly, if the 11-bit intra-block DC coefficient is quantized with the quantizer step size of 1, the maximum intra-block DC coefficient 2040 divided by 1 is still 2040 requiring 11 bits represent the quantized coefficient. On the other hand, if the intra-block DC coefficient is quantized with the step size of 2, the maximum intra-block DC coefficient 2040 divided by 2 is 1020 requiring 10 bits to represent the quantized coefficient; in case of using the step size of 4, it would require 9 bits; and, with the step size of 8, 2040 divided by 8 is 255, requiring 8 bits.

As a result, the prior art schemes are faced with the dilemma that if the amount of data transmitted is small, the transmission image quality resulting therefrom becomes poor, for example, producing a blocking effect; and, if the quality is to be improved, the amount of data required to be transmitted will increase, lowering the encoding efficiency.

SUMMARY OF THE INVENTION

It is, therefore, a primary object of the present invention to provide a method which is capable of eliminating or ameliorating the aforementioned blocking effect substantially by quantizing intra-block DC transform coefficients adaptively to human visual perception characteristics, to thereby improve the perceived quality of a transmitted image without having to increase the amount of the data imposed on the transmission channel.

In accordance with the present invention, there is provided a method for quantizing intra-block DC transform coefficients for use in a digitized video signal encoder which provides an encoded video signal for transmission from an input digital video signal comprised of a plurality of equal-sized blocks, each of the blocks being either an inter-mode or an intra-mode video signal, said method comprising the steps of: converting each of the plurality of blocks included in the input digital video signal into a set of inter-block or intra-block DC and AC transform coefficients; selecting an intra-block DC transform coefficient from said set of inter-block or intra-block DC and AC transform coefficients; determining an intra-block DC quantizer step size based on a set of the selected intra-block DC transform coefficients; and generating a quantized intra-block DC transform coefficient from each of the transform coefficients included in the set of the selected intra-block DC transform coefficients through the use of said intra-block DC quantizer step size.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
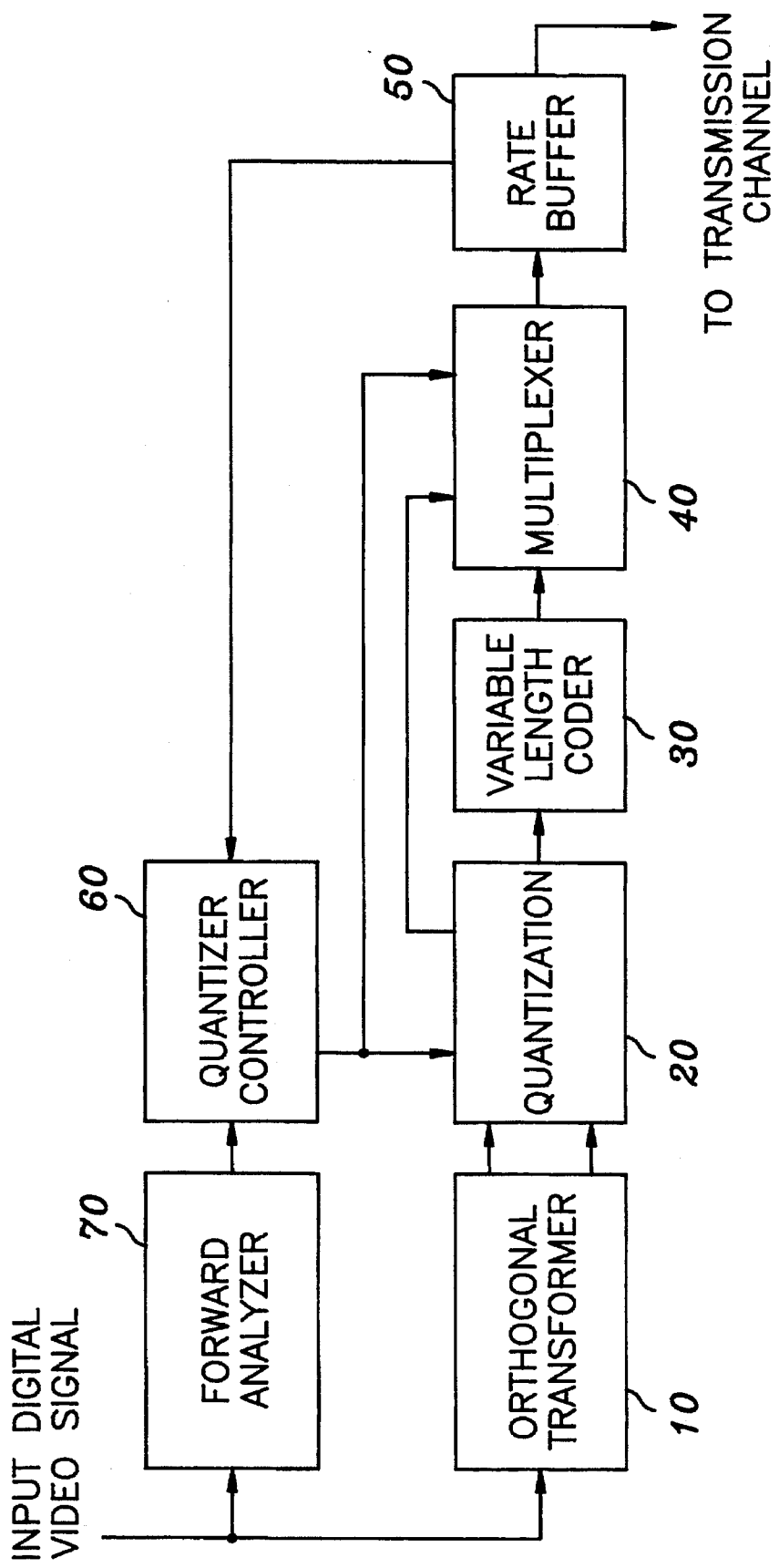
FIG. 1 is a schematic block diagram of a video signal encoding apparatus.

Referring to FIG. 1, there is shown a block diagram of a digitized video signal encoding apparatus. An input digital video signal is fed to an orthogonal transformer 10 and a forward analyzer 70. The input digital video signal comprises a plurality of equal-sized blocks, each of the blocks being either an inter-mode video signal or an intra-mode video signal of, e.g., 8×8 pixels.

The forward analyzer 70 serves to analyze the input digital video signal and determine the degree of complexity of the video signal from the variance thereof to issue a complexity index to a quantizer controller 60.

The orthogonal transformer 10, which converts pixel data of the video signal from the spatial domain into the frequency domain, generates a set of transform coefficients comprising one DC and sixty three AC coefficients for each of the equal-sized blocks of 8×8 pixels. To indicate whether a coefficient to be quantized at a quantization block 20 is an intra-block DC or one of intra-block AC coefficients, both of which are generated from a block of intra-mode video signal, or one of inter-block AC/DC coefficients generated from a block of inter-mode video signal, a coefficient indication signal is also outputted to the quantization block 20.

In response to a control signal, e.g, a quantizer scale, from the quantizer controller 60, the quantization block 20 determines the quantizer step size for each of such orthogonal transform coefficients as inter-block AC/DC and intra-block AC coefficients from the orthogonal transformer 10, and quantizes the same with the determined quantizer step size.

Quantization of the intra-block DC coefficients is carried out in accordance with the present invention. Quantized transform coefficients outputted from the quantization block 20 are sent to a variable length coder 30 and an intra-block DC quantizer step size also outputted from the quantization block 20 is sent to a multiplexer 40. Details of the quantization block 20 will be further described hereinafter with reference to FIG. 2.

In the variable length coder 30, the quantized transform coefficients produced from the quantization block 20 are successively processed and encoded in accordance with the variable length coding method as well known in the art.

The multiplexer 40 is used to send the variable length coded coefficients from the variable length coder 30 to a rate buffer 50, together with such information as the quantizer scale from the quantizer controller 60 and the intra-block DC quantizer step size from the quantization block 20.

The variable length coded coefficients and such information as the quantizer scale and the intra-block DC quantizer step size are temporarily held at the rate buffer 50, and then transmitted to the transmission channel. The number of bits which are currently being held at the rate buffer 50, i.e., buffer-fullness or buffer content, is outputted therefrom to the quantizer controller 60 wherein the quantizer scale is determined based on the buffer content from the rate buffer 50 and the complexity index from the forward analyzer 70.

Figure 2:
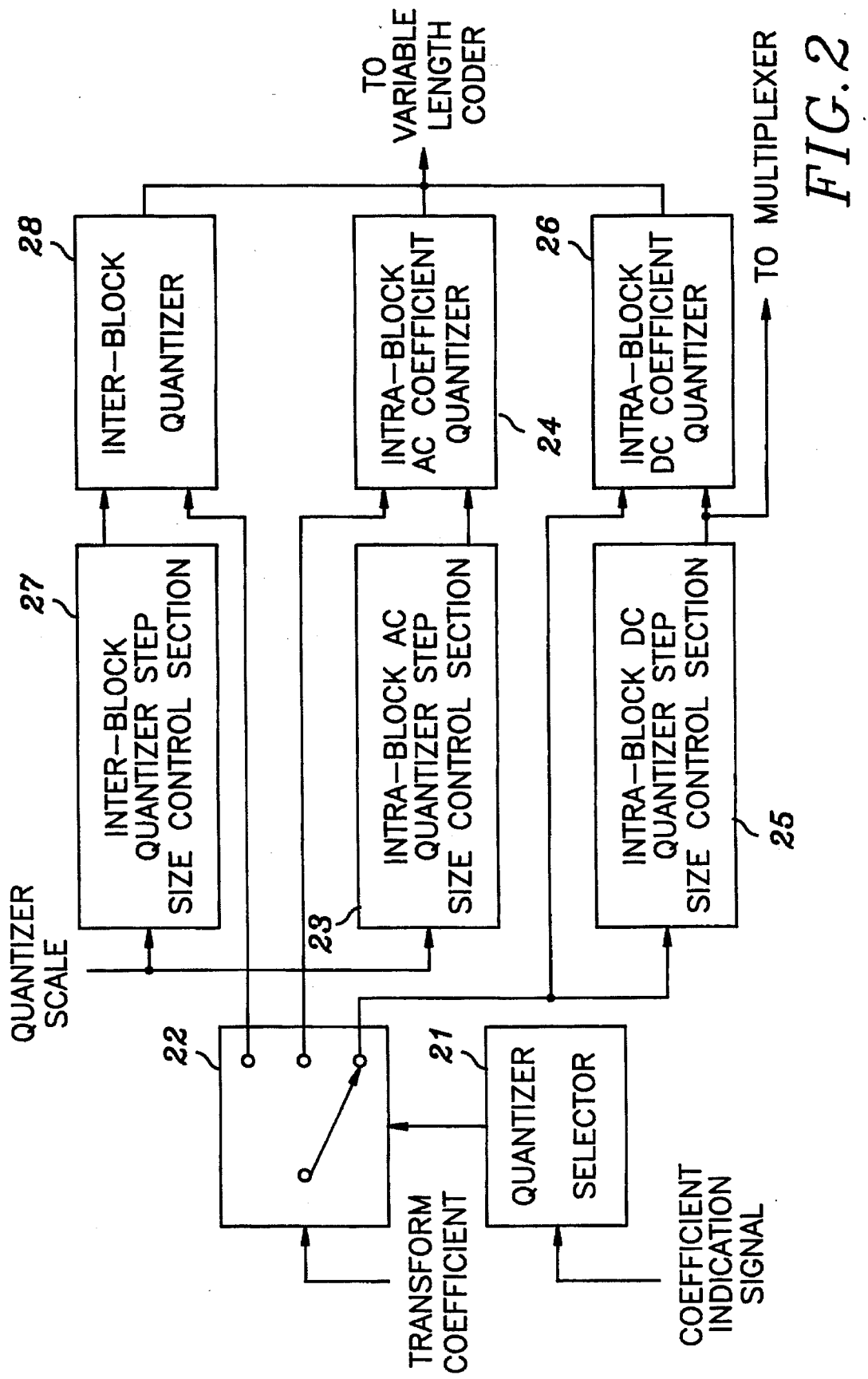
FIG. 2 represents a detailed block diagram of the inventive quantization block shown in FIG. 1; and, FIG. 3 illustrates human visual characteristics responding to the intensity of an image.

Referring now to FIG. 2, there is provided a detailed diagram of the inventive quantization block 20 shown in FIG. 1. The transform coefficients and the coefficient indication signal from the orthogonal transformer 10 shown in FIG. 1 are fed to a switch 22 and a quantizer selector 21, respectively.

The quantizer selector 21 is responsive to the input coefficient indication signal to thereby control the switch 22 to select a quantizer to be used to quantize a transform coefficient. That is, an intra-block DC transform coefficient is fed to an intra-block DC coefficient quantizer 26 and to an intra-block DC quantizer step size control section 25; each of the intra-block AC transform coefficients, to an intra-block AC coefficient quantizer 24; and each of the inter-block AC/DC transform coefficients, to an inter-block quantizer 28.

The quantizer scale from the quantizer controller 60 shown in FIG. 1 is dispatched to quantizer step size control sections 23 and 27.

The inter-block quantizer step size control section 27 calculates and determines the inter-block AC/DC quantizer step size for quantizing inter-block AC/DC transform coefficients using the quantizer scale inputted thereto. Actually, the quantizer step size is derived from the quantizer scale and the inter-block quantization matrix having matrix elements of an identical value as well known in the art.

The intra-block AC quantizer step size control section 23 determines the intra-block AC quantizer step size for quantizing intra-block AC coefficients in a similar fashion as performed at the inter-block quantizer step size control section 27. Matrix elements of the intra-block AC quantization matrix, however, have various values and thus the intra-block AC quantizer step size can be different for different AC transform coefficients.

The quantizer step sizes from the inter-block quantizer step size control section 27 and intra-block AC quantizer step size control section 23 are fed to the inter-block quantizer 28 and the intra-block AC coefficient quantizer 24, respectively, wherein the value of a transform coefficient inputted from the switch 22 is divided by the corresponding quantizer step size and rounded to the nearest integer number to produce the quantized transform coefficient.

In the preferred embodiment of the present invention, the intra-block DC coefficient is quantized with a variable quantizer step size determined at the intra-block DC quantizer step size control section 25 making use of human visual characteristics according to Weber's law.

Figure 3:
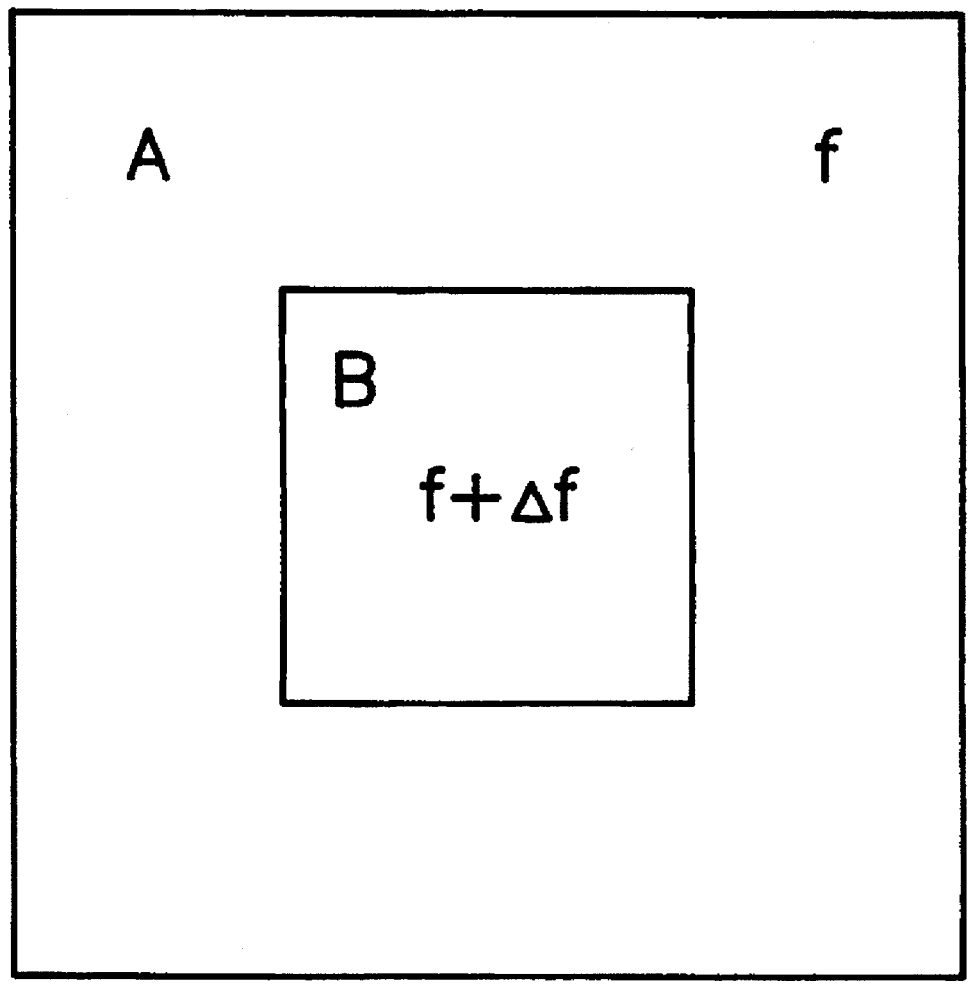

Referring to FIG. 3, there are illustrated human visual characteristics. According to Weber's law, the human visual system can separate and recognize a given area only if the intensity of the area is brighter than or darker than that of the surrounding area by a certain degree (see William K. Pratt, Digital Image Processing, John Wiley & Sons (2nd ed., 1991)). In other words, as shown in FIG. 3, if the average intensity of the surrounding area A is f and the average intensity of the center area B is f+∆f, then the center area B is separately recognized by the human eye only when the value |∆f|/f is greater than or equal to 0.02. Accordingly, if an area is to be recognized separately, the area should be brighter or darker than the surrounding area by at least 2%. As a result, in an area where f is small, or the average intensity is low, an object can be readily discerned even if the object is brighter or darker than the area only by a small degree; whereas in an area where f is large, or the average intensity is high, the object should be much brighter or darker than the surrounding area to be perceived by the human eye.

Utilizing the human visual characteristic described above, the present invention quantizes the intra-block DC coefficient, which represents the average intensity of a block with a quantizer step size varying with the value of the intra-block DC coefficient. In a dark area where the average intensity of the area is low and, therefore, the intra-block DC coefficient is small, the quantizer step size is set to a small number so that a fine quantization is executed to correspond to the more sensitive human perception. Likewise, in a bright area where the average intensity of the area is high and the intra-block DC coefficient is large, the quantizer step size is adjusted to a large value so that a coarse quantization is executed to increase the encoding efficiency for the bright area where the human perception is less sensitive.

The intra-block DC quantizer step size can be determined on a unit basis. There are three kinds of units: block, macroblock and GOB(group of blocks). A block may be a block of 8×8 pixels as mentioned above. Four such blocks constitute each of a multiplicity of macroblocks included in a GOB. Any unit can be utilized in the intra-block DC quantizer step size determination. Generally, an image does not change drastically in a macroblock; and, therefore, the image may be quantized without having its quality deteriorated if a macroblock is chosen as the unit for determining the intra-block DC quantizer step size.

Returning to FIG. 2, the intra-block DC quantizer step size control section 25 in accordance with the invention determines the quantizer step size based on the intra-block DC transform coefficients inputted from the switch 22. Specifically, if the largest intra-block DC coefficient in a macroblock has a value between 0 and 255, the quantizer step size is set at 1 so that a very fine quantization can be executed in the relatively dark macroblock where the human visual system is sensitive, perceiving even small changes in intensity. In a similar manner, if the value of the largest intra-block DC coefficient in a macroblock ranges from 256 to 510, the quantizer step size is set at 2; if from 511 to 1020, the quantizer step size is set at 4; and if from 1021 to 2040, the quantizer step size is set at 8.

The intra-block DC quantizer step size, which can be represented in two bits to indicate said four quantizer step sizes, is fed to the intra-block DC coefficient quantizer 26, wherein each of the intra-block DC coefficients in a given macroblock, which is used to determine the intra-block DC quantizer step size, is divided by the quantizer step size applied thereto and rounded to the nearest integer number to produce the quantized intra-block DC transform coefficient. Using such quantizer step sizes, only 8 bits are required to express the quantized intra-block DC coefficient derived from the intra-block DC coefficient with a value ranging from 0 to 2040.

The intra-block DC quantizer Step size is also outputted from the intra-block DC quantizer step size control section 25 to the multiplexer 40 shown in FIG. 1 so as to enable the receiver to decode the received data properly: that is, the intra-block DC transform coefficient can be calculated at the decoder from the transmitted quantized intra-block DC coefficient through the use of the transmitted intra-block DC quantizer step size. The quantized transform coefficients from the inter-block quantizer 28, the intra-block AC coefficient quantizer 24 and the intra-block DC coefficient quantizer 26 are dispatched to the variable length coder 30 shown in FIG. 1.

It should be appreciated that the intra-block DC quantizer step size can be determined in other manners than that described hereinabove: for example, the quantizer step sizes other than 1, 2, 4 and 8 can be assigned or different ranges of DC transform coefficient can be used for determining the quantizer step sizes as long as the use of such schemes turns out to be more conducive to the reproduction of better video images.

As a result, therefore, using the inventive method for encoding an intra-mode video signal, the overall subjective quality of an image can be enhanced since a fine quantization is performed in an area where the human vision is sensitive while a coarse quantization is performed in an area where the human vision is less sensitive. Moreover, in accordance with the present invention, the encoding efficiency is increased since only 8 bits are needed to represent the quantized coefficients, and, therefore, the amount of data transmitted through the transmission line may be reduced in comparison with the prior art systems wherein up to 11 bits are required to represent the quantized intra-block DC coefficient.

While the present invention has been described with respect to certain preferred embodiments only, other modifications and variations may be made without departing from the spirit and scope of the present invention as set forth in the following claims.

What is claimed is:

1. A method for quantizing intra-block DC transform coefficients for use in a digitized video signal encoder which provides an encoded video signal for transmission from an input digital video signal comprised of a plurality of equal-sized blocks, each of the blocks being either an inter-mode or an intra-mode video signal, said method comprising the steps of:

converting each of the plurality of blocks included in the input digital video signal into a set of inter-block or intra-block DC and AC transform coefficients;

selecting an intra-block DC transform coefficient from said set of inter-block or intra-block DC and AC transform coefficients;

determining an intra-block DC quantizer step size for each set of a predetermined number of selected intra-block DC transform coefficients based on the selected intra-block DC transform coefficients included therein; and generating a quantized intra-block DC transform coefficient from each of the transform coefficients included in each set of the selected intra-block DC transform coefficients through the use of said intra-block DC quantizer step size.

2. The method in accordance with claim 1, wherein said predetermined number is 4.

3. The method in accordance with claim 2, wherein said intra-block DC quantizer step size is determined as 1 if the maximum value of the transform coefficients included in the set of the selected intra-block DC transform coefficients is within a range of 0 to 255; as 2, if the maximum value is within a range of 256 to 510; as 4, if it is within a range of 511 to 1020; and as 8, if it is within a ranges of 1021 to 2040.

* * * * *